April 24, 1956  H. J. DAVIDSON ET AL  2,742,839
WEED AND ROOT DIGGER AND SEPARATOR
Filed July 24, 1953  3 Sheets-Sheet 1
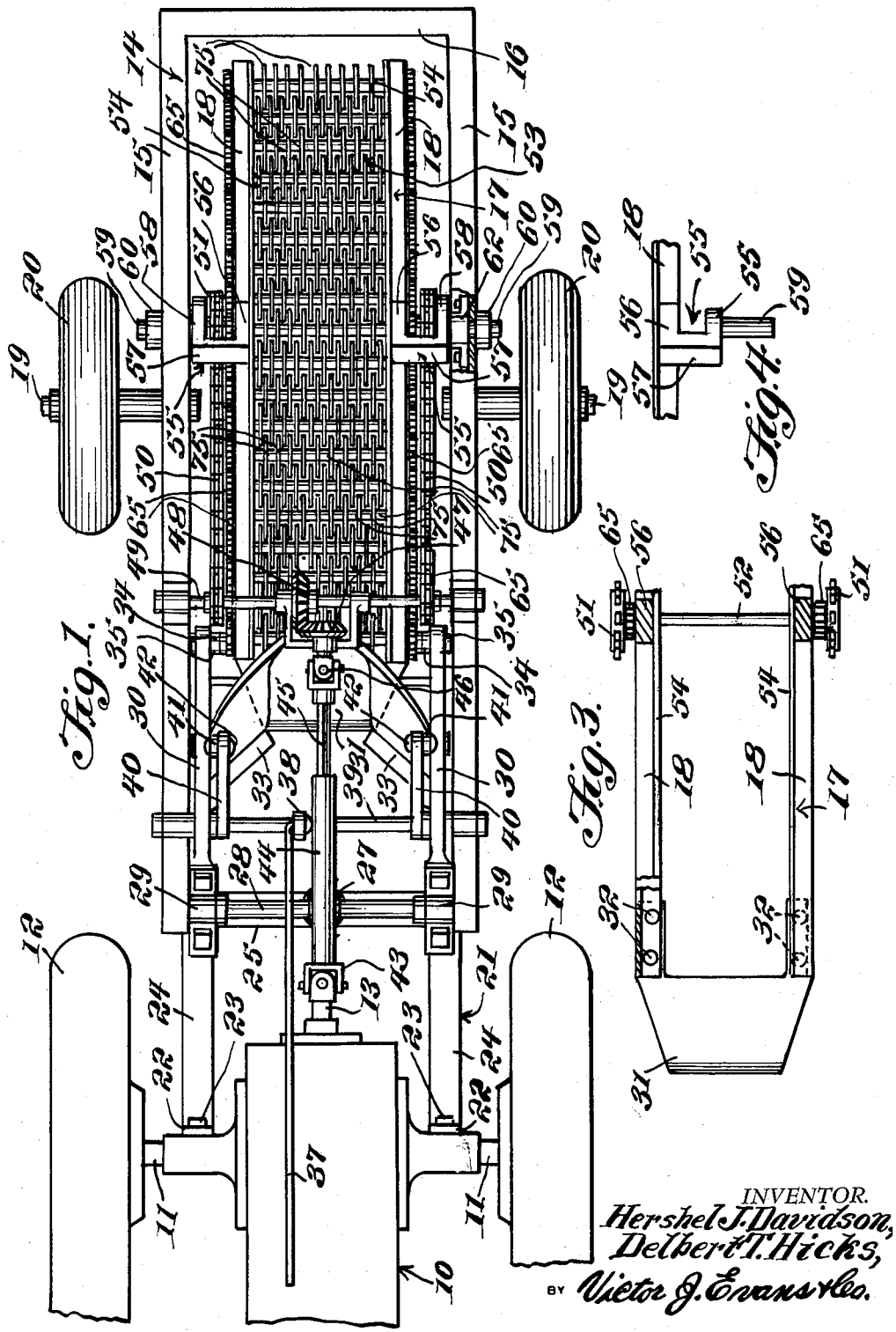
INVENTOR.
Hershel J. Davidson,
Delbert T. Hicks,
BY Victor J. Evans & Co.
ATTORNEYS

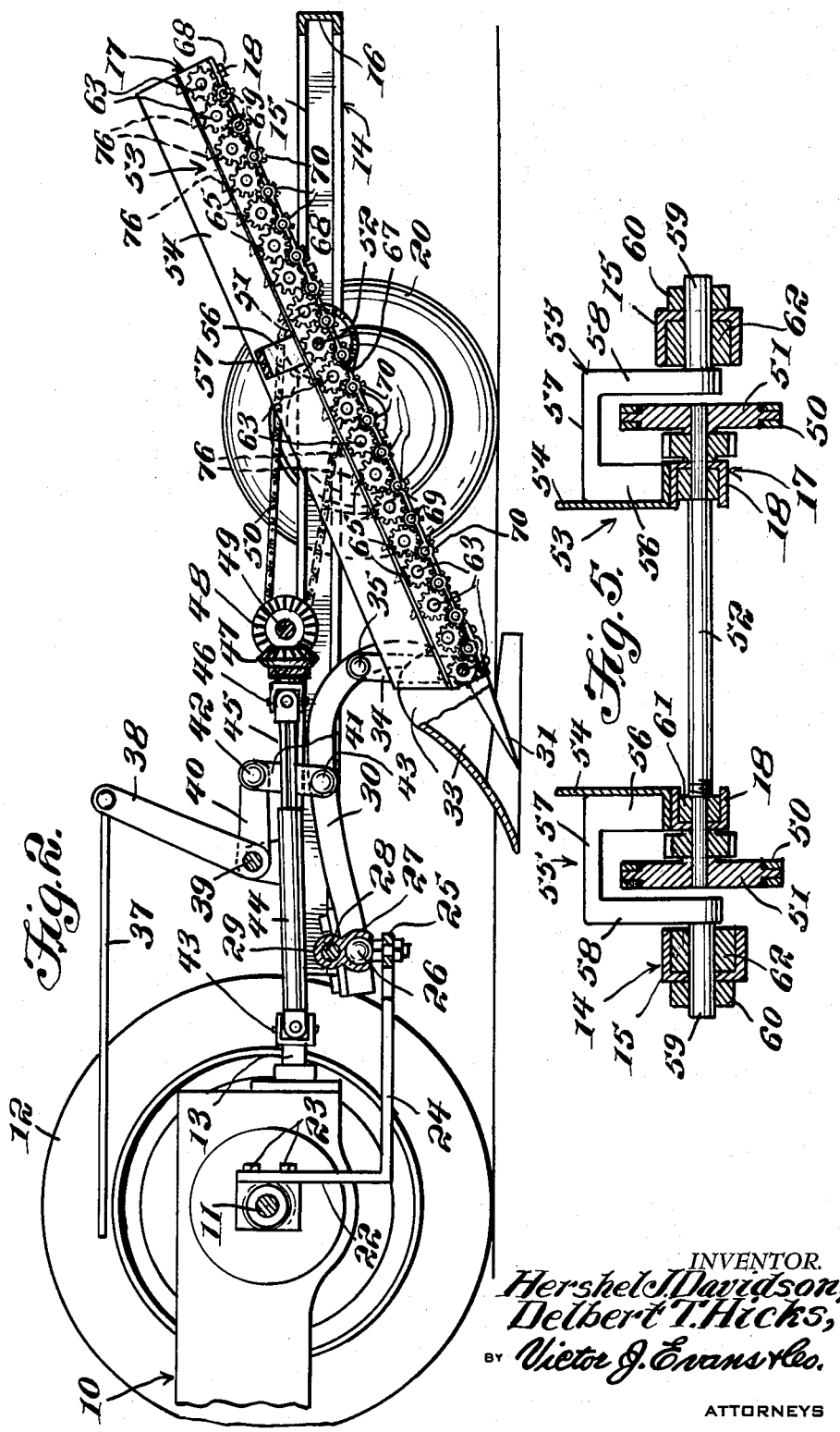

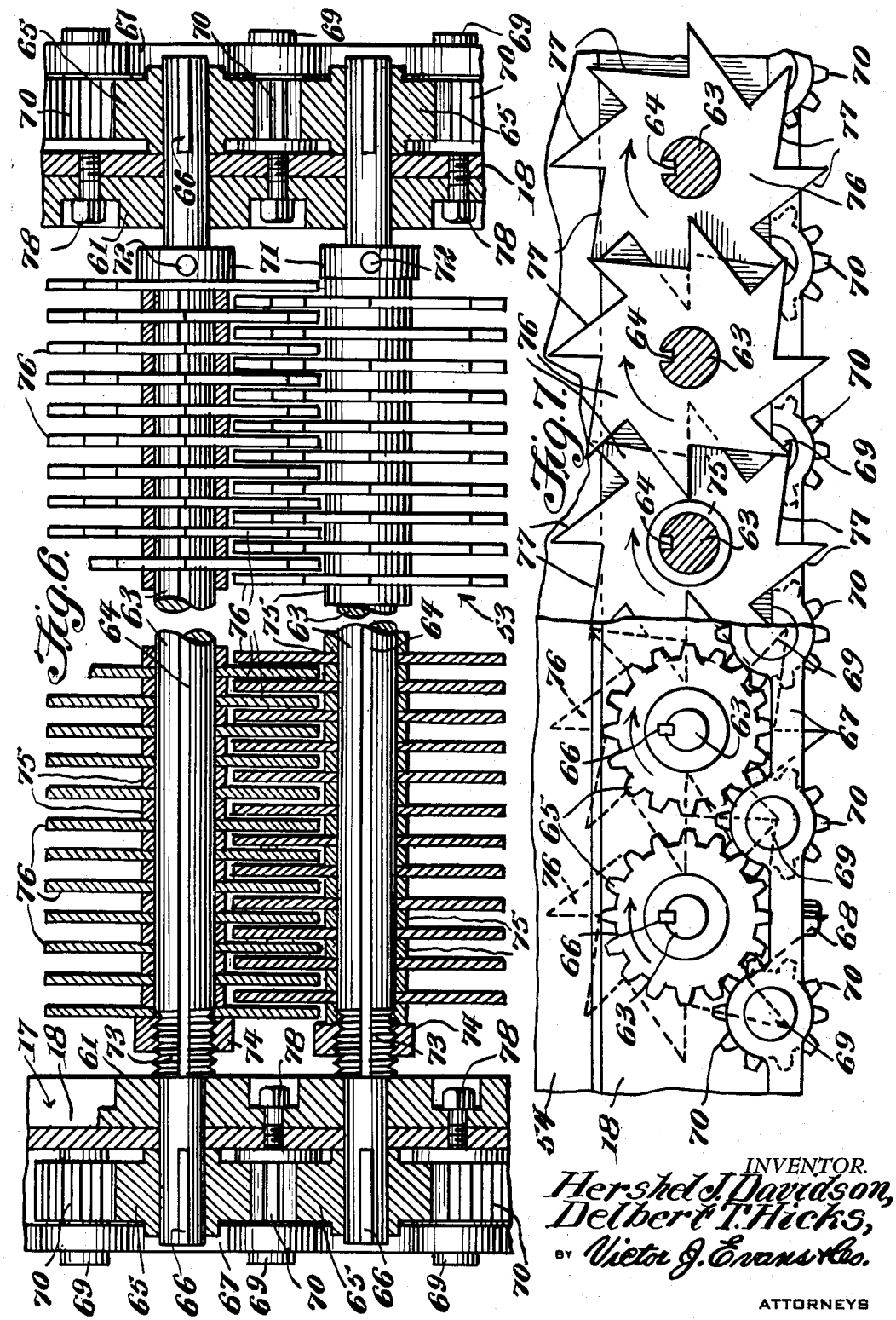

United States Patent Office 2,742,839
Patented Apr. 24, 1956

2,742,839

WEED AND ROOT DIGGER AND SEPARATOR

Hershel J. Davidson and Delbert T. Hicks, Lake Providence, La.; said Davidson assignor to said Hicks Application July 24, 1953, Serial No. 370,124

2 Claims. (Cl. 97—10)

This invention relates to agricultural equipment, and more particularly to a root separator.

The object of the invention is to provide a root separator which is adapted to be pulled along by a suitable vehicle such as a tractor whereby the soil will be separated from the roots and grass, the soil being returned to the ground, and the roots and grass being conveyed to a suitable receptacle.

Another object of the invention is to provide a root separator which is especially suitable for removing or separating noxious weeds or grass such as Johnson grass, the machine of the present invention adapted to be towed by a farm tractor and wherein the soil or dirt will be separated from the roots so that the soil can be returned to the ground and wherein the roots and other foreign matter can be conveyed back to any suitable location.

Another object of the invention is to provide a root separator which will remove foreign matter from the ground, the machine of the present invention serving to dig up the sod or ground and removing the weeds or grass from the soil in a single cultivating operation.

A further object of the invention is to provide a root separator which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a top plan view of the root separator, constructed according to the present invention.

Figure 2 is a side elevational view of the root separator.

Figure 3 is a fragmentary top plan view showing the inner frame with the blade or knife attached thereto, and with parts broken away and in section.

Figure 4 is a fragmentary plan view showing one of the yokes for attaching the inner frame to the outer frame or body member.

Figure 5 is a transverse sectional view showing the pivotal connection between the inner frame and the outer body member as well as the drive mechanism.

Figure 6 is an enlarged sectional view showing the rotary cutters or discs.

Figure 7 is a fragmentary elevational view, with parts broken away and in section, showing the connection between the drive gears and idler gears.

Referring in detail to the drawings, the numeral 10 designates a portion of a conventional tractor which is adapted to be used for towing or pulling the root separator of the present invention. The tractor 10 includes the usual rear wheels 12 supported by axles 11. A power take-off 13 extends rearwardly from the tractor, Figure 1.

The present invention is directed to a root separator for separating the roots of grass such as Johnson grass or other foreign matter from the soil, and wherein the soil is permitted to be returned to the ground while the roots and other foreign material are conveyed rearwardly to a crusher or other suitable receptacle. The root separator includes an outer frame or body member 14 which comprises a pair of spaced parallel beams 15 that are interconnected together at their rear ends by a crosspiece 16. Positioned within the body member 14 is an inner frame 17 which is mounted for movement about a horizontal axis as later described in this application. The inner frame 17 includes a pair of spaced parallel bars or channel members 18.

The root separator is supported by ground engaging wheels 20 which are mounted on axles 19 that are connected to the beams 15. Connected to the rear portion of the tractor 10 is the usual drawbar 21 which includes vertical portions 22 that are secured to the tractor by bolt and nut assemblies 23. Extending from the lower ends of the vertical portions 22 are horizontal portions 24 which are interconnected together by a straight section 25. A ball member 26 extends upwardly from the straight section 25, and a socket 27 rotatably engages the ball member 26. The socket member 27 includes bearings 29 that engage a shaft 28.

A pair of plow beams 30 are pivoted to the shaft 28 and extend rearwardly from the drawbar, and the frame can be swung or adjusted due to the provision of the ball or socket joint. The plow beams are pivoted to the shaft 28 by bearings and the frame 14 can swing on the ball and socket. A knife or blade 31 is secured to the front end of the bars 18 on the frame 17, by suitable securing elements, such as rivets or bolt and nut assemblies 32. A plow 33 is arranged on each side of the blade 31, and links 34 are provided for connecting the plow beams 30 to the frame 17. Thus, a pin 35 connects each of the links 34 to one of the beams 30, while the lower end of the link 34 is connected to a corresponding channel member 18 by a pin or bolt and nut assembly. The plows 33 are secured to the lower rear portions of the plow beams 30, so that in order to pivot the inner frame 17 it is only necessary to raise or lower the plow beams 30 which are pivotally connected to the drawbar.

A means is provided for raising and lowering the plow beams and inner frame, and this means comprises a rod 37 which may extend to a location adjacent the driver's seat of the tractor. The rod 37 has its rear end pivotally connected to an arm or lug 38 which is mounted on a shaft 39, and secured to the shaft 39 are arms 40, there being one of the arms 40 for each of the plow beams 30. Links 41 have one end connected to the arms 40 by pins 42, and the lower end of each of the links 41 is pivotally connected to the corresponding plow beam 30 by a pin 43. The rod 37 may be hydraulically actuated or otherwise controlled so that by reciprocating or moving the rod 37 the plow beams and inner frame can be adjusted or pivoted.

A universal joint 43 connects the power take-off 13 to a sleeve 44, and mounted in the sleeve 44 is a square shaft 45. A universal joint 46 connects the shaft 45 to a bevel gear 47 which is arranged in meshing engagement with a bevel gear 48 that is mounted on a shaft 49, the shaft 49 being journaled or rotatably supported in the beams 15 of the body member 14.

A pair of sprockets are mounted on the shaft 49, and an endless chain 50 is trained over each of these sprockets. The chains 50 are also trained over sprockets 51 which are mounted on a drive shaft 52, Figure 5. These chains provide power for the endless conveyor and separator mechanism 53 which is carried by the inner frame 17. A pair of vertically disposed spaced parallel guard plates 54 are secured to the channel members 18 in any suitable manner, and the guard plates 54 guide the roots and dirt and other material during their movement along the conveyor.

A means is provided for pivotally connecting the inner frame 17 to the body member 14 so that the frame 17 can be adjusted to any desired angular position. This means comprises a pair of yokes 55, Figure 5. Each of the yokes 55 includes a vertical portion 56 that is secured to a channel member 18. Extending transversely with respect to the vertical portion 56 is a web 57 that has depending therefrom a straight section 58, and secured to the straight section 58 is a stub shaft 59 which extends through a corresponding channel 15. A collar 60 is mounted on the outer end of each of the stub shafts 59. A suitable bearing 61 is positioned in the channel member 18, and a bearing member 62 is positioned in the beam 15 for the stub shaft 59. It will be seen that the drive shaft 52 terminates inside of or short of the stub shafts 59.

A portion of the conveying and separating mechanism is shown in detail in Figures 6 and 7 and it will be seen that there is provided a plurality of driven shafts 63 which are arranged in spaced parallel relation with respect to each other. Each of the driven shafts 63 is provided with a slot or keyway 64, and the shafts 63 are carried by the swinging frame 17. A gear wheel 65 is mounted on each end of each of the shafts 63 so that each of the shafts 63 has two of the gear wheels 65 thereon. The gear wheels 65 may be secured in place on the shafts 63 by means of keys 66. A bearing bar 67 is positioned below each of the channel members 18, and the bearing bar 67 may be secured in place by bolt and nut assemblies 68. Supported by the bearing bar 67 is a plurality of shafts 69, and mounted on each of the shafts 69 is an idler gear 70 which meshes with the gear wheel 65. It will be seen from Figure 7 and from Figure 2, that one of the idler gears 70 is interposed between each pair of gear wheels 65 and this arrangement of intermeshing gears insures that all of the gears and consequently all of the shafts 63 rotate in unison in the same direction.

A stop collar 71 is mounted on each of the shafts 63 by means of a pin 72, and each of the shafts 63 is further provided with a threaded portion 73, and a nut 74 is arranged in engagement with the threaded portion 73 for maintaining the various blades or cutting elements in their proper assembled relation. A plurality of toothed discs or knives 76 are secured to each of the shafts 63 so that as the shafts 63 rotate the knives 76 rotate therewith. A spacer member 75 is interposed between each of the parallel discs 76. Each of the discs 76 is provided with a plurality of points and cutting edges 77, Figure 7. Thus, it will be seen that the discs 76 on one driven shaft 63 interfit with the discs 76 on the adjacent driven shaft so that the cutting edges 77 have a scissors like action to thereby separate the roots and other foreign matter from the soil to permit the soil to pass downwardly through the discs 76 and be deposited back on the ground. The foreign matter such as the roots or grass which is separated from the soil will be conveyed upwardly and rearwardly by the discs 76 whereby it can be deposited in any suitable receptacle. Bolts 78 may be provided for securing the bearing members 61 to the channel members 18.

From the foregoing it is apparent that a root separator has been provided for separating roots, vines, grass and the like from soil. In use, the implement is attached to the tractor 10 as shown in Figures 1 and 2 and when the power take-off 13 is actuated, power is transmitted to the shaft 49 through the sleeve 44 and through the shaft 45 and through the intermeshing bevel gears 47 and 48. Rotation of the shaft 49 causes rotation of the endless chains 50 to thereby rotate the drive shaft 52 by the medium of the sprockets 51. As the drive shaft 52 rotates there will be rotation of the gear wheels 65 which are mounted on the drive shaft 52, and these gear wheels mesh with the adjacent idler gears 70. Thus, all of the idler gears and gear wheels will rotate in unison to thereby rotate the driven shafts 63 in the same direction. As the drive shafts 63 rotate, the toothed discs 76 will all rotate and the interfitting discs 76 will effect a separation between the roots and soil. The soil will drop down between these discs and be returned to the ground while the roots and grass and the like will be conveyed rearwardly and upwardly by the inclined conveyor 53 to any suitable location.

The frame 17 carrying the conveyor 53 can be adjusted or swung about a horizontal axis extending through the shaft 52 by means of the rod 37 and attached linkage. Thus, by actuating the rod 37 the plow beams 30 will be raised or lowered to thereby raise or lower the front end of the inner frame. The plows 33 and scoop or blade 31 scoop up the soil as the implement is pulled along by the tractor and these members guide the soil onto the conveyor or separator.

The present invention will not permit the roots of the grass to return with the clods of dirt so that the grass will be effectively destroyed. By separating the roots from the soil the roots can be destroyed. The present invention is especially suitable for eliminating grass such as Johnson grass since the roots of Johnson grass are very detrimental to vegetable growth. Such roots vary in size from about ⅛ of an inch to ¾ of an inch in diameter, and vary from one to several feet in length. Any suitable hitch can be used for attaching the present invention to a tractor. The assembly 53 acts as a revolving self-cleaning screen to let the earth sift through while at the same time serving as an elevator to clean and move the roots and other foreign material up and back whereby the roots may be either destroyed so that any germination therein will be destroyed or deposited in any suitable receptacle. Thus, the germination of the roots can be destroyed by crushing, grinding or else these roots can be deposited back on the soil after having been crushed and ground to be used as fertilizer or they can be dumped in a hopper or trailer to be disposed of as desired. Also, the gears 70 and 65 may be replaced by drive chains.

The root separator mechanism can be driven from the power take-off of the tractor or from a separate power unit mounted on the machine.

We claim:

1. A root separator comprising a stationary body member adapted to be attached to a tractor and including a pair of spaced parallel horizontally disposed beams, a crosspiece extending between the rear ends of said beams and secured thereto, ground engaging wheels connected to said body member, a frame positioned within said body member, said frame including a pair of spaced parallel channel members, means pivotally connecting said frame to said body member for swinging movement about a horizontal axis, said means comprising a yoke connected to each of said channel members, each of said yokes including a vertical portion secured to said channel members, a web extending transversely with respect to said vertical portion, a straight section depending from said web, a stub shaft extending from each of the straight sections of the yokes and engaging a corresponding beam, a drive shaft extending between said pair of yokes, a plurality of driven shafts extending between said channel members and rotatably supported thereby, gear means connecting said drive shafts and driven shafts together, a body shaft rotatably supported by said body member, chain and sprocket means connecting said body shaft to said drive shaft, a plurality of interfitting discs mounted on said driven shafts, a spacer member interposed between each adjacent pair of discs, each of said discs being provided with a plurality of points and cutting edges, a blade mounted on the front of said frame, a pair of plows arranged on opposite sides of said blade and operatively connected to said frame, said gear means comprising a gear wheel mounted on each end of each of said drive and driven shafts, a bearing bar mounted below each of said channel members, idler gears supported by said bearing bar and interconnecting said gear wheels together, a pair of vertically disposed spaced parallel guard plates extending upwardly from said channel members and secured thereto, and means for adjusting the position of said frame, said last named means comprising beams extending from said plows and having links pivotally connected thereto, arms pivotally connected to said links, a shaft journalled on said body member and secured to said arms, a lug connected to said last named shaft, and a movable rod pivotally connected to said lug.

2. A root separator comprising a stationary body member adapted to be attached to a tractor and including a pair of beams, a crosspiece extending between said beams and secured thereto, ground engaging wheels connected to said body member, a frame positioned within said body member, said frame including a pair of channel members, means pivotally connecting said frame to said body member, for swinging movement about a horizontal axis, said means comprising a yoke connected to each of said channel members, each of said yokes including a vertical portion secured to said channel members, a web extending transversely with respect to said vertical portion, a straight section depending from said web, a stub shaft extending from each of the straight sections of the yokes and engaging a corresponding beam, a drive shaft extending between said pair of yokes, a plurality of driven shafts extending between said channel members and rotatably supported thereby, gear means connecting said drive shafts and driven shafts together, a body shaft rotatably supported by said body member, chain and sprocket means connecting said body shaft to said drive shaft, a plurality of interfitting discs mounted on said driven shaft, a spacer member interposed between each adjacent pair of discs, each of said discs being provided with a plurality of points and cutting edges, a blade mounted on said frame, a pair of plows arranged on opposite sides of said blade and operatively connected to said frame, said gear means comprising a gear wheel mounted on each end of each of said drive and driven shafts, a bearing bar mounted below each of said channel members, idler gears supported by said bearing bar and interconnecting said gear wheels together, a pair of guard plates extending upwardly from said channel members and secured thereto, and means for adjusting the position of said frame.

References Cited in the file of this patent
UNITED STATES PATENTS

| | | |
|---|---|---|
| 960,743 | Voegele | June 7, 1910 |
| 1,634,172 | Carrick | June 28, 1927 |
| 1,760,203 | Menke | May 27, 1930 |
| 1,802,536 | Romera | Apr. 28, 1931 |
| 2,302,973 | Sargent | Nov. 24, 1942 |
| 2,401,653 | Mohler | June 4, 1946 |